US012263687B2

(12) United States Patent
Nakanishi

(10) Patent No.: US 12,263,687 B2
(45) Date of Patent: Apr. 1, 2025

(54) EXPOSURE HEAD AND IMAGE FORMING APPARATUS

(71) Applicant: CANON KABUSHIKI KAISHA, Tokyo (JP)

(72) Inventor: Koichiro Nakanishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,685

(22) Filed: Dec. 2, 2021

(65) Prior Publication Data

US 2022/0197177 A1 Jun. 23, 2022

(30) Foreign Application Priority Data

Dec. 18, 2020 (JP) ................................ 2020-210268

(51) Int. Cl.
*B41J 2/45* (2006.01)
*B41J 2/47* (2006.01)
*G03G 15/04* (2006.01)

(52) U.S. Cl.
CPC . *B41J 2/45* (2013.01); *B41J 2/47* (2013.01); *G03G 15/04054* (2013.01)

(58) Field of Classification Search
CPC .......... B41J 2/45; B41J 2002/453; B41J 2/47; G03G 15/04054
See application file for complete search history.

(56) References Cited

U.S. PATENT DOCUMENTS 9,513,106 B2 12/2016 Nakanishi
11,275,322 B2 3/2022 Nakanishi
2004/0233271 A1* 11/2004 Nojima .................... B41J 2/451 347/238
2012/0195608 A1* 8/2012 Yokoi ........................ B41J 2/45 399/51
2013/0250031 A1* 9/2013 Ohno ........................ B41J 2/385 347/238
2015/0277269 A1* 10/2015 Suzuki .................... F21V 21/00 362/382
2017/0031263 A1 2/2017 Woo
(Continued)

FOREIGN PATENT DOCUMENTS

JP 2003182136 A * 7/2003
JP 2006-76148 A 3/2006
(Continued)

OTHER PUBLICATIONS

U.S. Appl. No. 17/474,344, filed Sep. 14, 2021, by Koichiro Nakanishi.
(Continued)

*Primary Examiner* — Justin Seo
*Assistant Examiner* — Kendrick X Liu
(74) *Attorney, Agent, or Firm* — VENABLE LLP

(57) ABSTRACT

The plurality of surface light emitting element array chips in the first row and the plurality of surface light emitting element array chips in the second row are arranged in a staggered manner along the main scanning direction, and a space between the plurality of surface light emitting element array chips in the first row and the plurality of surface light emitting element array chips in the second row is set so as not to be an integral multiple of an image resolution pitch in the sub-scanning direction.

10 Claims, 9 Drawing Sheets

(56) References Cited

U.S. PATENT DOCUMENTS

| | | | | |
|---|---|---|---|---|
| 2018/0314184 | A1 | 11/2018 | Watanabe | |
| 2019/0377279 | A1* | 12/2019 | Yoshida | G03G 15/043 |
| 2020/0241436 | A1* | 7/2020 | Watanabe | G03G 15/0266 |

FOREIGN PATENT DOCUMENTS

| | | | |
|---|---|---|---|
| JP | 2009-296003 | A | 12/2009 |
| JP | 2013-50636 | A | 3/2013 |
| JP | 2015-112856 | A | 6/2015 |
| JP | 2017-132139 | A | 8/2017 |
| JP | 2017-183436 | A | 10/2017 |
| JP | 2018-183946 | A | 11/2018 |

OTHER PUBLICATIONS

Japanese Office Action issued Jul. 16, 2024 in corresponding Japanese Patent Application No. 2020-210268 (Engligh translation included).

Japanese Office Action issued Oct. 8, 2024 during prosecution of related Japanese application No. 2020-210268 (English-language machine translation included.).

Japanese Office Action issued Jan. 7, 2025 during prosecution of related Japanese Application No. 2020-210268 (English translation included).

* cited by examiner

EXPOSURE HEAD AND IMAGE FORMING APPARATUS

BACKGROUND OF THE INVENTION

Field of the Invention

The present invention relates to an exposure head that exposes a photosensitive drum to light, and an image forming apparatus including the exposure head.

Description of the Related Art

Conventionally, there has been generally known an electrophotographic system printer in which a photosensitive drum is exposed to light by an exposure head using a light emitting element such as an LED or an organic EL to form a latent image on the photosensitive drum. Such an exposure head includes light emitting element rows arranged in the longitudinal direction of the photosensitive drum and a rod lens array that forms an image of light of the light emitting element rows on the photosensitive drum. The LED or the organic EL as the light emitting element includes a surface light emitting element array in which the irradiation direction of light from the light emitting surface is parallel to the optical axis of the rod lens array.

Here, in the exposure head, the length of the light emitting element row is determined according to the width of an image forming region on the photosensitive drum, and the space between the light emitting elements is determined according to the image resolution of a printer. For example, in a 1200 dpi printer, since the space between pixels is 21.16 μm (the numbers after three decimal places are cut), the space between the light emitting elements is also 21.16 μm. Since the printer using such an exposure head uses a smaller number of components than a laser scanning printer that deflects and scans a laser beam with a polygon motor, it is easy to reduce the size and cost of the apparatus.

In such a situation, Japanese Patent Application Laid-Open No. 2015-112856 discloses an exposure head in which a TFT circuit and an organic EL are provided on a long transparent glass substrate. In addition, Japanese Patent Application Laid-Open No. 2009-296003 discloses an exposure head that is formed using an LED/driving IC composite chip in which an integrated circuit thin film and a light emitting layer thin film are attached on a long substrate. Furthermore, Japanese Patent Application Laid-Open 2017-183436 discloses an exposure head including a compound semiconductor chip in which a self-scanning light emitting element is formed on a long substrate.

However, Japanese Patent Application Laid-Open No. 2015-112856, Japanese Patent Application Laid-Open No. 2009-296003, and Japanese Patent Application Laid-Open No. 2017-183436 have a problem that electric noise is easily radiated because the substrate has an elongated shape and can be electrically regarded as an antenna. For example, the exposure head with an image width of 300 mm and an image resolution of 1200 dpi requires 14,000 or more light emitting elements in the main scanning direction, and thus includes a large number of light emitting elements. In a case where a large number of light emitting elements are turned on in such an exposure head, there is a problem that noise increases to be easily radiated in cooperation with the shape of the substrate.

In order to handle this, a method of reducing noise by shifting the light emission timing of the light emitting element is conceivable, but in a case where the light emission timing is shifted, there is a concern that the position in the sub-scanning direction of an image to be formed is shifted and the image quality is degraded.

SUMMARY OF THE INVENTION

Therefore, it is desirable to provide an exposure head and an image forming apparatus capable of reducing noise without degrading image quality.

An exposure head according to the present invention is an exposure head that exposes a photosensitive drum, the exposure head including a substrate, a plurality of semiconductor chips provided on a surface of the substrate, in which a plurality of light emitting elements that emits light is arranged in a main scanning direction, the plurality of semiconductor chips being arranged in two rows of a first row and a second row in a sub-scanning direction orthogonal to the main scanning direction, and a lens array that condenses light from the plurality of light emitting elements onto the photosensitive drum, wherein the plurality of semiconductor chips in the first row and the plurality of semiconductor chips in the second row are arranged in a staggered manner along the main scanning direction, and a space between the plurality of semiconductor chips in the first row and the plurality of semiconductor chips in the second row is set so as not to be an integral multiple of an image resolution pitch in the sub-scanning direction.

Further features of the present invention will become apparent from the following description of exemplary embodiments with reference to the attached drawings.

DESCRIPTION OF THE EMBODIMENTS

Figure 1:
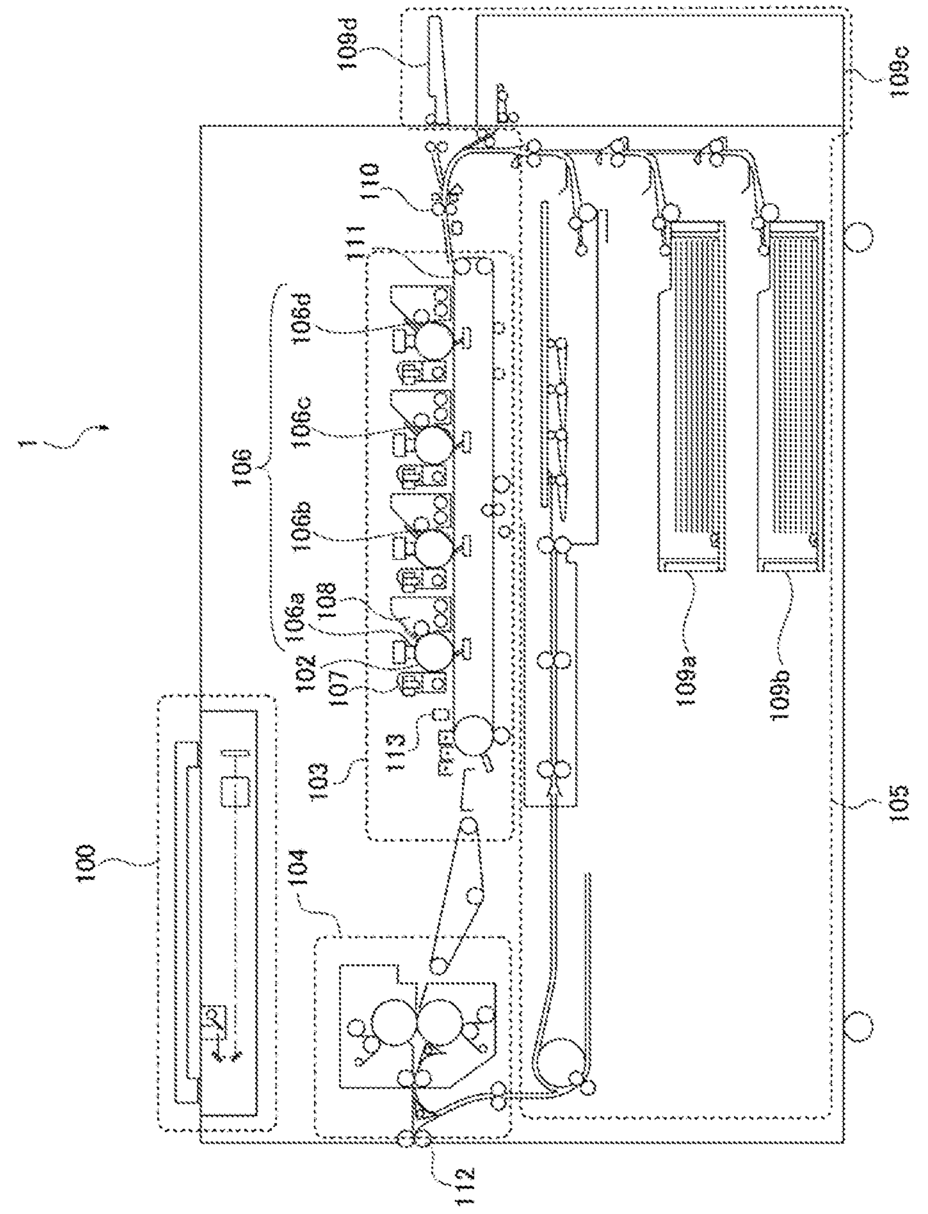
FIG. 1 is a schematic diagram of an image forming apparatus according to a first embodiment of the present invention.

Hereinafter, embodiments will be described in detail with reference to the drawings.

First Embodiment

<Configuration of Image Forming Apparatus>

A configuration of an image forming apparatus 1 according to a first embodiment of the present invention will be described in detail with reference to FIG. 1.

The image forming apparatus 1 includes a scanner portion 100, an image forming portion 103, a fixing portion 104, a sheet feeding/conveying portion 105, and a registration roller 110.

The scanner portion 100 illuminates an original placed on an original base plate to optically read an image of the original, and converts the read image into an electrical signal to create image data. The scanner portion 100 outputs the created image data to a printer controller (not illustrated).

The image forming portion 103 operates under the control of the printer controller to form an image on a sheet conveyed from the registration roller 110 and conveys the sheet having the image formed thereon to the fixing portion 104. The image forming portion 103 includes four image forming units that perform a series of electrophotographic processes including charging, exposure, development, and transfer. The image forming portion 103 forms a full-color image on a sheet by four image forming units arranged in order of cyan (C), magenta (M), yellow (Y), and black (K). Each of the four image forming units sequentially performs magenta, yellow, and black image forming operations after a predetermined time elapses from the start of cyan image formation.

Specifically, the image forming portion 103 includes a photosensitive drum 102, an exposure head 106, a charger 107, a development device 108, a transfer belt 111, and an optical sensor 113.

The photosensitive drum 102 as an image bearing member is attached to the image forming apparatus 1 by an attachment member (not illustrated) to be rotationally driven.

The exposure head 106 is attached to the image forming apparatus 1 by an attachment member (not illustrated). The exposure head 106 includes four exposure heads 106*a*, 106*b*, 106*c*, and 106*d* corresponding to four image forming units. The exposure head 106 condenses light emitted on the basis of image data on the photosensitive drum 102 and exposes the photosensitive drum 102 to light, thereby forming a latent image (an electrostatic latent image) on the photosensitive drum 102. Note that details of the configuration of the exposure head 106 will be described later.

The charger 107 charges the photosensitive drum 102.

The development device 108 supplies toner to the latent image formed on the photosensitive drum 102 and develops the latent image, thereby forming a toner image (a developer image) on the photosensitive drum 102.

The transfer belt 111 conveys a sheet conveyed from the registration roller 110 to the fixing portion 104. The toner image developed by the development device 108 is transferred to the sheet conveyed by the transfer belt 111.

The optical sensor 113 is provided at a position facing the transfer belt 111, and detects the position of a test chart printed on the transfer belt 111 in order to derive a color shift quantity between the image forming units. The optical sensor 113 outputs the detection result of the position of the test chart to an image controller portion (not illustrated). The image controller portion derives a color shift quantity between the image forming units of the image forming portion 103 on the basis of the detection result of the position of the test chart input from the optical sensor 113, and executes control to correct the image position of each color. With this control, the full-color toner image without any color shift is transferred onto the sheet.

The fixing portion 104 includes a combination of rollers, and incorporates therein a heat source such as a halogen heater (not illustrated). The fixing portion 104 dissolves and fixes the toner on the sheet having the toner image transferred thereto by the image forming portion 103 to the sheet by heat and pressure, and discharges the sheet having the toner fixed thereon to the outside of the image forming apparatus 1 by a discharge roller 112.

The sheet feeding/conveying portion 105 includes an in-body sheet feeding unit 109*a*, an in-body sheet feeding unit 109*b*, an external sheet feeding unit 109*c*, and a manual sheet feeding unit 109*d*, and feeds a sheet from a sheet feeding unit designated in advance and conveys the sheet to the registration roller 110.

The registration roller 110 conveys a sheet conveyed from the sheet feeding/conveying portion 105 to the transfer belt 111 at the timing when the toner image formed in the image forming portion 103 is transferred onto the sheet.

The printer controller controls operations of the scanner portion 100, the image forming portion 103, the fixing portion 104, and the sheet feeding/conveying portion 105. The printer controller communicates with an MFP controller that controls the entire MFP (the entire image forming apparatus 1), and controls the operations according to an instruction of the MFP controller while managing the states of the scanner portion 100, the image forming portion 103, the fixing portion 104, and the sheet feeding/conveying portion 105.

<Configuration of Exposure Head>

A configuration of the exposure head 106 according to the first embodiment of the present invention will be described in detail with reference to FIGS. 2A to 3C.

Figure 2A:
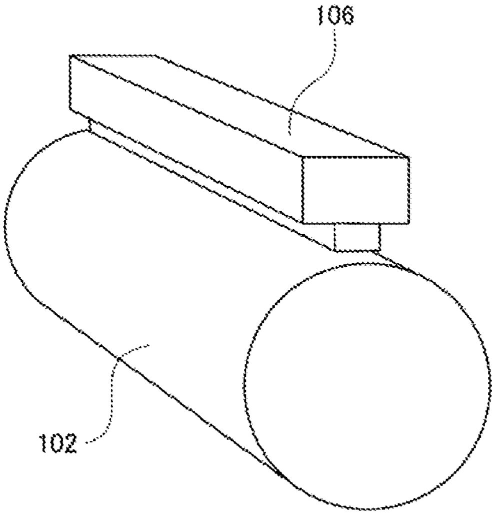
FIGS. 2A and 2B are schematic diagrams of an exposure head and a photosensitive drum according to the first embodiment of the present invention.
Figure 2B:
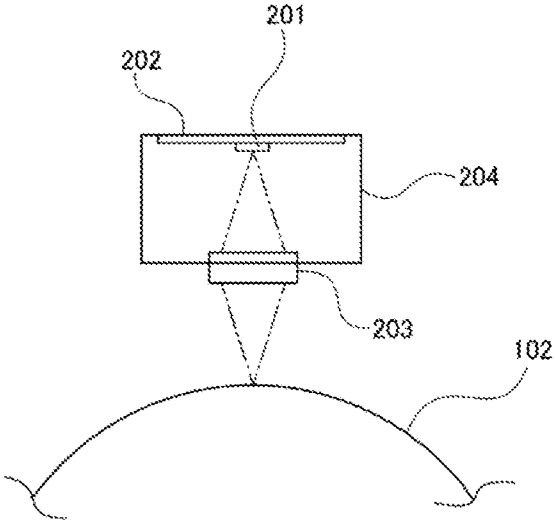

FIG. 2A illustrates a state of arrangement of the exposure head 106 with respect to the photosensitive drum 102, and FIG. 2B illustrates a state where light emitted from a light emitting element group 201 is condensed on the photosensitive drum 102 by a rod lens array 203.

Figure 3A:
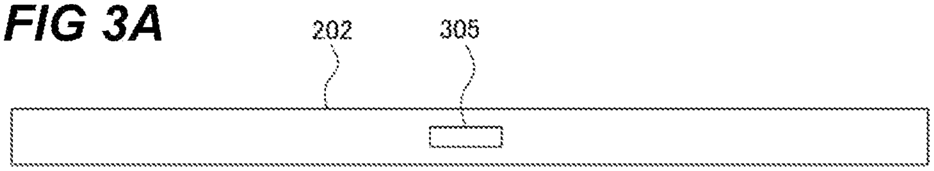
FIGS. 3A to 3C are schematic diagrams illustrating a configuration of the exposure head according to the first embodiment of the present invention.
Figure 3B:
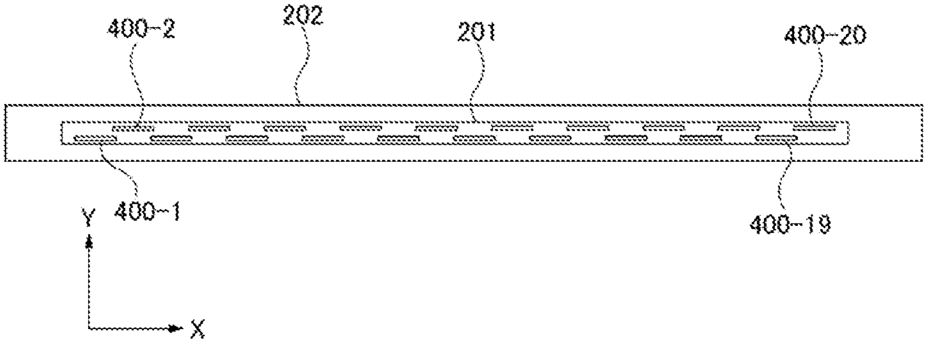
Figure 3C:
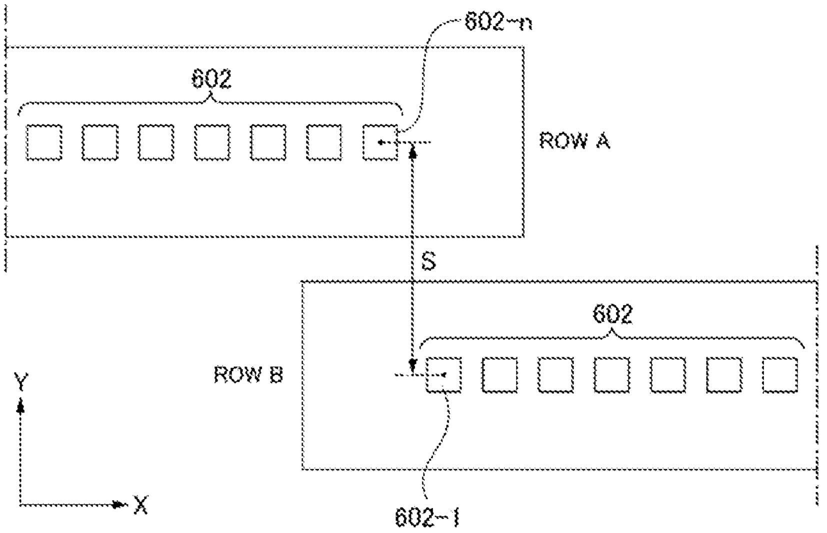

FIG. 3A illustrates a surface (hereinafter, referred to as “light emitting element non-mounting surface”) of a printed circuit board 202 opposite to a surface on which the light emitting element group 201 is mounted, and FIG. 3B illustrates a surface (hereinafter, referred to as “light emitting element mounting surface”) on which the light emitting element group 201 is mounted. FIG. 3C illustrates a state of boundary portions between surface light emitting element array chips 400-1 to 400-20.

The exposure head 106 includes the light emitting element group 201, the printed circuit board 202, the rod lens array 203, and a housing 204.

The light emitting element group 201 is mounted on the light emitting element mounting surface of the printed circuit board 202, and includes surface light emitting element array chips 400-1 to 400-20 as 20 semiconductor chips. As illustrated in FIG. 3B, the surface light emitting element array chips 400-1 to 400-20 are arranged in two rows of a row A as a first row and a row B as a second row in the Y direction that is a sub-scanning direction orthogonal to the X direction that is a main scanning direction. The surface light emitting element array chips 400-2, 400-4, 400-6, . . . , and 400-20 in the row A and the surface light emitting element array chips 400-1, 400-3, 400-5, . . . , and 400-19 in the row B are arranged in a staggered manner along the X direction.

A space S between the surface light emitting element array chips 400-2, 400-4, 400-6, . . . , and 400-20 in the row A and the surface light emitting element array chips 400-1, 400-3, 400-5, . . . , and 400-19 in the row B is set so as not to be an integral multiple of the minimum distance in the Y direction of a latent image formed on the photosensitive drum 102. Specifically, the space S is set so as to satisfy the following Equation (1).

$$S=(\alpha+\beta)\times Ly \quad (1)$$

where α is a positive integer,

β is a real number satisfying 0<β<1, and

Ly is the minimum distance in the Y direction of the latent image formed on the photosensitive drum 102.

Ly in Equation (1) is the same as an image resolution pitch (a space between pixels) in the Y direction, and is, for example, approximately 21.16 μm in a case where the image resolution pitch in the Y direction is 1200 dpi.

In the present embodiment, Ly=21.16 μm, α=14, and β=0.5 are substituted into Equation (1), and the solution is rounded off to the nearest whole number, so that S=307 μm. As a result, the exposure head 106 can reduce noise without degrading image quality.

In each of the surface light emitting element array chips 400-1 to 400-20, 748 light emitting elements 602 are arranged at a predetermined image resolution pitch in the X direction that is a longitudinal direction. Here, the image resolution pitch is 1200 dpi (approximately 21.16 μm), for example. In addition, the space from end to end of 748 light emitting elements 602 in each of the surface light emitting element array chips 400-1 to 400-20 is approximately 15.8 mm in this example.

In this example, the image resolution pitch between a light emitting element **602-*n* and a light emitting element 602-1 located at each of the boundaries between the surface light emitting element array chips 400-1 to 400-20 illustrated in FIG. 3C is also 1200 dpi (approximately 21.16 μm). Note that the light emitting elements 602 located at the boundaries between the surface light emitting element array chips 400-1 to 400-20 may be arranged so that several pixels overlap in consideration of the mounting accuracy of the surface light emitting element array chips 400-1 to 400-20**.

The surface light emitting element array chips 400-1 to 400-20 are fixed to the printed circuit board 202 by, for example, an ultraviolet curable adhesive, a thermosetting adhesive, or a conductive adhesive. The surface light emitting element array chips 400-1 to 400-20 are driven by a control signal input from a driver IC (not illustrated) via a connector 305. Note that details of the configuration of the surface light emitting element array chips 400-1 to 400-20 will be described later.

In a case where the number of light emitting elements 602 that can perform exposure is 14,960 elements, the exposure head 106 enables image formation with an image width of approximately 316 mm.

As illustrated in FIG. 3A, the printed circuit board 202 as a substrate includes the connector 305 and a driver IC (not illustrated) for driving the light emitting element group 201 on the light emitting element non-mounting surface. As illustrated in FIG. 3B, the light emitting element group 201 is mounted on the light emitting element mounting surface as a surface of the printed circuit board 202.

The connector 305 is connected to the driver IC provided on the light emitting element non-mounting surface of the printed circuit board 202 and a power supply (both are not illustrated) via a signal line (not illustrated), and is also connected to the light emitting element group 201.

The rod lens array 203 is arranged such that the distance from the light emitting element group 201 is a predetermined distance, and the distance from the photosensitive drum 102 is also a predetermined distance, and forms an image of light emitted from the light emitting element group 201 on the photosensitive drum 102.

The rod lens array 203 and the printed circuit board 202 are attached to the housing 204.

The exposure head 106 with the above configuration is assembled as a single product in a factory, and focus adjustment for adjusting a spot at a condensing position to a predetermined size and light quantity adjustment are performed. Here, in the focus adjustment, the attachment position of the rod lens array 203 is adjusted such that the distance between the rod lens array 203 and the light emitting element group 201 is a desired distance. In the light quantity adjustment, the light emitting elements 602 of the light emitting element group 201 are individually and sequentially caused to emit light, and the drive current of each light emitting element 602 is adjusted such that the light condensed on the photosensitive drum 102 through the rod lens array 203 has a predetermined light quantity.

<Configuration of Surface Light Emitting Element Array Chip>

Figure 4:
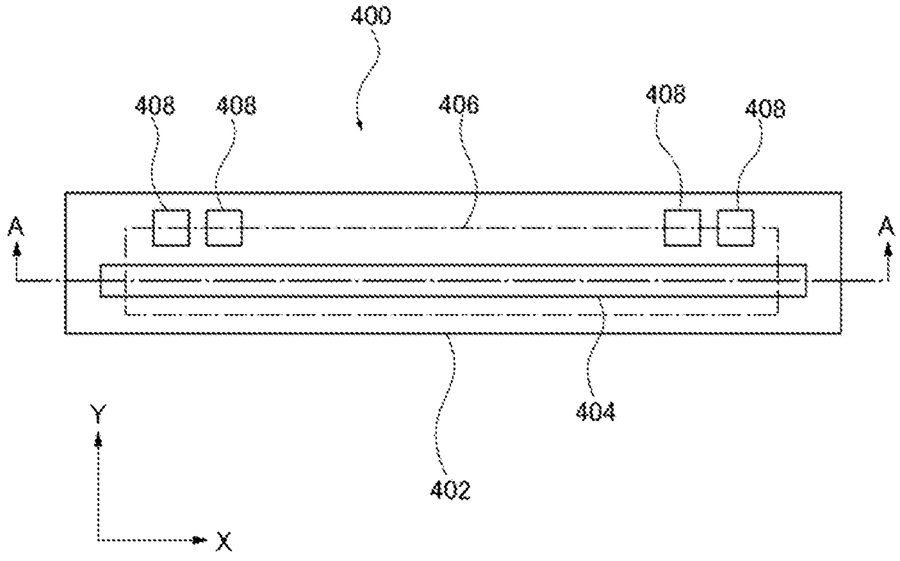
FIG. 4 is a schematic diagram of a surface light emitting element array chip of the exposure head according to the first embodiment of the present invention.

A configurations of the surface light emitting element array chips 400-1 to 400-20 of the exposure head 106 according to the first embodiment of the present invention will be described in detail with reference to FIG. 4.

The surface light emitting element array chip 400 is a chip configured by including the light emitting element 602 on a Si substrate, and includes a light emitting substrate 402, a light emitting portion 404, a circuit portion 406, and wire bonding pads (WB pads) 408.

The light emitting substrate 402 is a Si substrate, and includes the light emitting portion 404, the circuit portion 406, and the wire bonding pads 408. Here, since processing techniques for forming integrated circuits have developed and the Si substrate is already used as a substrate for various integrated circuits, there are advantages that it is possible to form high-speed and highly functional circuits with high density, and it is possible to obtain the Si substrate at low cost since large-diameter wafers are available.

The light emitting portion 404 includes the light emitting element 602. Note that details of the configuration of the light emitting portion 404 will be described later.

The circuit portion 406 has a circuit configuration including an analog drive circuit, a digital control circuit, or both an analog drive circuit and a digital drive circuit, and controls the light emitting portion 404.

The wire bonding pad 408 supplies power to the circuit portion 406 or inputs and outputs signals between the surface light emitting element array chip 400 and the outside.

Note that the light emitting portion 404 may be a compound semiconductor thin film such as AlGaAs that is formed on a Si substrate on which a drive circuit is formed in advance by a transfer method.

<Configuration of Light Emitting Portion>

A configuration of the light emitting portion 404 in the surface light emitting element array chips 400-1 to 400-20 of the exposure head 106 according to the first embodiment of the present invention will be described in detail with reference to FIG. 5.

The light emitting portion 404 includes a portion in which the light emitting substrate 402 and an upper electrode 508 face each other and a light emitting layer 506 in the facing portion, and is configured by laminating a plurality of lower electrodes 504, the light emitting layer 506, and the upper electrode 508 in this order on the light emitting substrate 402.

The lower electrode 504 is an independent electrode, and is formed on the light emitting substrate 402. The lower electrode 504 has a width W in the X direction, and a plurality of the lower electrodes 504 is formed so as to be adjacent to each other in the X direction with a predetermined space d therebetween. The lower electrode 504 is formed by using a Si integrated circuit processing technique in which a processing rule is as highly accurate as approximately 0.2 μm together with the formation of the circuit portion 406, and is connected to a drive portion (not illustrated) of the circuit portion 406. As a result, the lower electrodes 504 can be arranged with high density and high accuracy, and the light emitting location of the light emitting element 602 is substantially the same as the location of the lower electrode 504, so that the light emitting elements 602 can be arranged with high density.

The lower electrode 504 can be formed of a metal with a high reflectance with respect to the emission wavelength of the light emitting layer 506, and is formed of silver (Ag), aluminum (Al), an alloy of silver and aluminum, or the like.

The light emitting layer 506 is formed on the lower electrode 504, and is, for example, an organic EL film or an inorganic EL film. In a case where the light emitting layer 506 is an organic EL film, the light emitting layer 506 is a laminated structure including functional layers such as an electron transport layer, a hole transport layer, an electron injection layer, a hole injection layer, an electron blocking layer, and a hole blocking layer as necessary.

In a case where the light emitting layer 506 is formed of a material sensitive to moisture such as an organic EL layer or an inorganic EL layer, it is desirable that the light emitting layer 506 is sealed in order to prevent moisture from entering the light emitting portion 404. The light emitting layer 506 prevents moisture from entering the light emitting portion 404 by, for example, a single thin film of silicon oxide, silicon nitride, aluminum oxide, or the like, or a sealing film formed by laminating thin films of silicon oxide, silicon nitride, aluminum oxide, and the like. As a method of forming the sealing film, a method excellent in covering a structure such as a step is preferable, and for example, an atomic layer deposition method (ALD method) can be used.

The light emitting layer 506 may be continuously formed, or may be cut into a size substantially equal to that of the lower electrode 504. In addition, the material, configuration, and forming method of the sealing film described above are only examples, and are not limited to the examples described above, and suitable material, configuration, and forming method may be appropriately selected.

The upper electrode 508 is a common electrode, and is formed on the light emitting layer 506. The upper electrode 508 can be transparent to the emission wavelength of the light emitting layer 506, and a transparent electrode such as indium tin oxide (ITO) can be used.

In the light emitting portion 404 with the configuration described above, the light emitting layer 506 is energized through the lower electrode 504 selected among the plurality of lower electrodes 504 and the upper electrode 508, thereby causing the light emitting layer 506 at a position corresponding to that of the lower electrode 504 selected to emit light. As a result, the light emitting portion 404 emits emission light through the upper electrode 508 on the side of the light emitting layer 506 opposite to the light emitting substrate 402.

As the upper electrode 508 is a transparent electrode such as indium tin oxide, the aperture ratio can be made substantially 100%, and light emission in the light emitting layer 506 can be used as emission light as it is. In addition, as the lower electrode 504 is formed by using a highly accurate Si integrated circuit processing technique, the lower electrodes 504 can be arranged with high density, and thus, it is possible to cause substantially the entire area of the light emitting portion 404 to emit light and to enhance the utilization efficiency of the light emitting portion 404. Here, the area of the light emitting portion 404 is an area obtained by adding the total area of the plurality of lower electrodes 504 to the total area of the plurality of spaces d.

<Arrangement of Light Emitting Elements in Light Emitting Portion>

An arrangement of the light emitting elements 602 in the light emitting portion 404 of the exposure head 106 according to the first embodiment of the present invention will be described in detail with reference to FIGS. 6A to 6C.

Figure 6A:
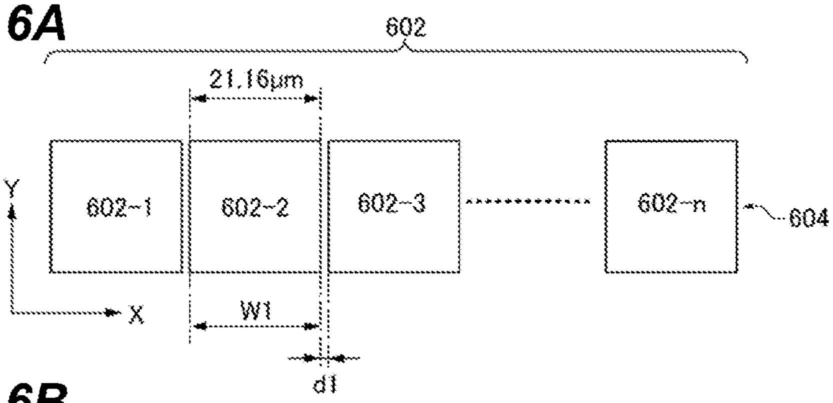
FIGS. 6A to 6C are schematic diagrams illustrating an arrangement of light emitting elements of the surface light emitting element array chip in the exposure head according to the first embodiment of the present invention.
Figure 6B:
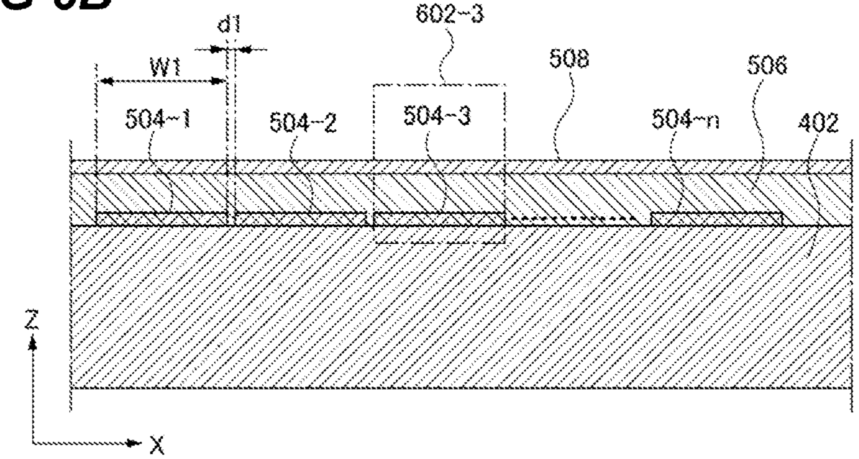
Figure 6C:
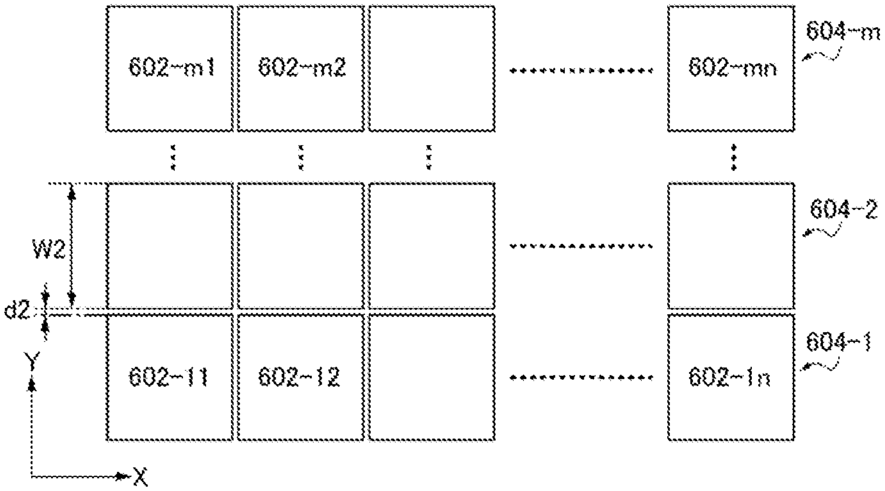

In FIGS. 6A to 6C, FIG. 6A is a plan view of a light emitting element row 604, FIG. 6B is a cross-sectional view of the light emitting element row 604, and FIG. 6C is a modification of the light emitting element row 604.

In FIGS. 6A and 6B, W1 indicates the width of the light emitting element 602 in the X direction, and d1 indicates the space between the light emitting elements 602 adjacent to each other in the X direction. In FIG. 6C, W2 indicates the width of the light emitting element 602 in the Y direction, and d2 indicates the space between the light emitting elements 602 adjacent to each other in the Y direction.

Furthermore, in FIG. 6B, for example, a light emitting element 602-3 is a portion surrounded by a one-dot chain line.

The light emitting element row 604 is configured by arranging a plurality of light emitting elements 602 with predetermined spaces (pitches) along the X direction. The predetermined space is, for example, 21.16 μm in a case where the image resolution in the Y direction is 1200 dpi. W1 is 20.9 μm and d1 is 0.26 μm in this example.

Figure 5:
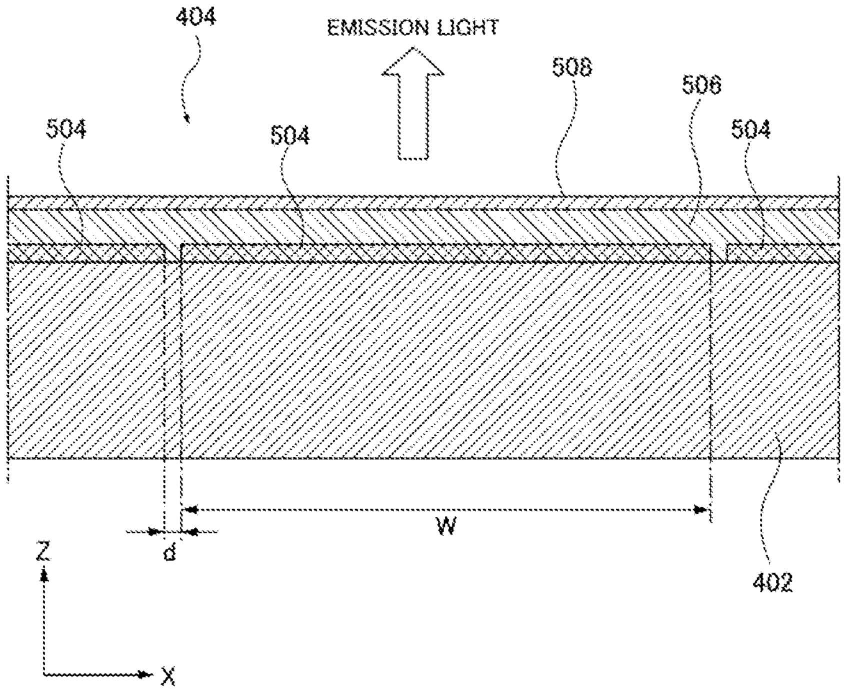
FIG. 5 is a cross-sectional view taken along a line A-A of FIG. 4.

Here, in a case where the light emitting layer 506 is sufficiently thin, the light emitting location of the light emitting element 602 is substantially the same as that of the lower electrode 504, and thus W1 may be regarded as W in FIG. 5, and d1 may be regarded as d in FIG. 5.

The light emitting element row 604 is not limited to a case where the light emitting elements 602 are arranged in a row in the X direction as illustrated in FIG. 6A, and the light emitting elements 602 may be arranged in a plurality of rows in the Y direction as illustrated in FIG. 6C. In FIG. 6C, m rows of the light emitting elements 602 are arranged in the Y direction to form the light emitting element rows 604. In a case where the light quantity of the light emitting element 602 is small, as illustrated in FIG. 6C, the light quantity required for the light emitting element 602 can be reduced to 1/m by performing multiple exposure in light emitting element rows 604-1, 604-2, . . . , and 604-*m*.

The light emitting element rows 604-1 to 604-*m* are configured by arranging a plurality of light emitting element rows 604 with predetermined spaces (pitches) along the Y direction. The predetermined space is, for example, 21.16 μm in a case where the image resolution in the Y direction is 1200 dpi. W2 is 20.9 μm and d2 is 0.26 μm in this example.

Here, the light emitting element 602 that has the light emitting layer 506 which is an organic EL layer is referred to as "organic EL element", and the light emitting element 602 that has the light emitting layer 506 which is an inorganic EL layer is referred to as "inorganic EL element".

<Operation of Exposure Head>

An operation of the exposure head 106 according to the first embodiment of the present invention will be described in detail with reference to FIGS. 7A to 8C.

Figure 7A:
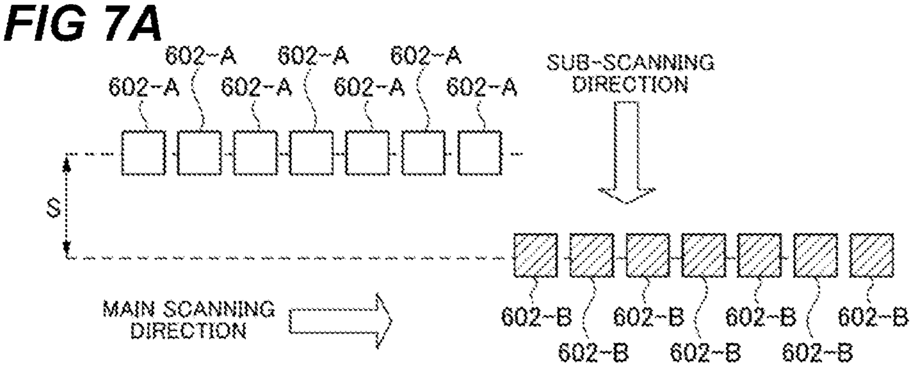
FIGS. 7A to 7C are timing charts of the exposure head according to the first embodiment of the present invention.
Figure 7B:
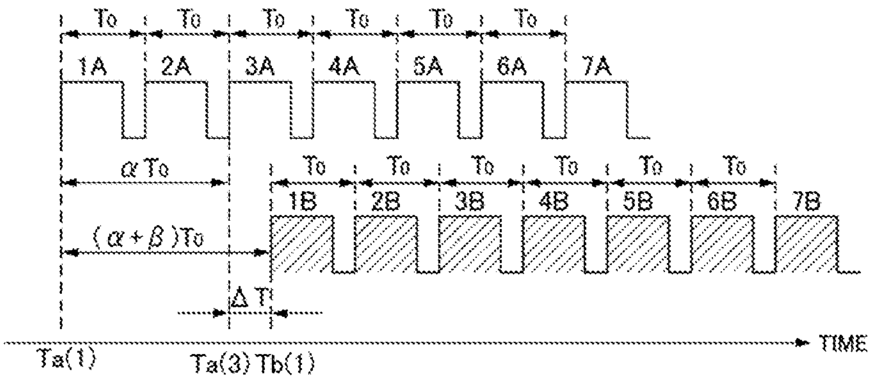
Figure 7C:
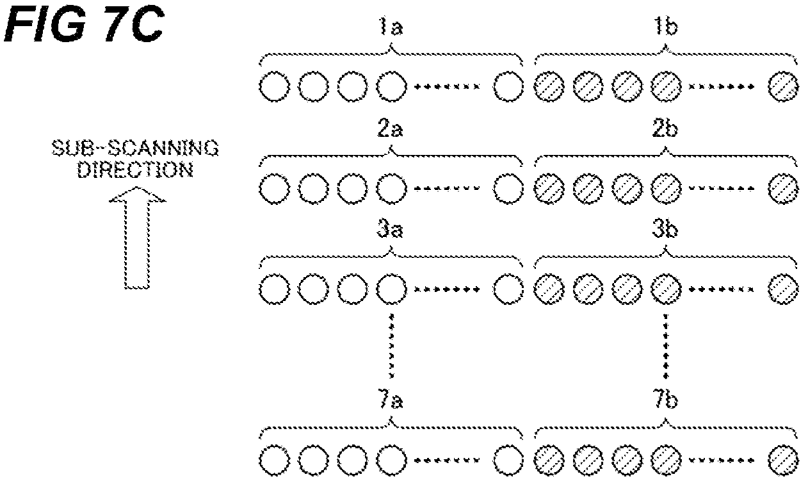

In FIGS. 7A to 7C, FIG. 7A is a diagram illustrating a part of light emitting elements 602-A of the surface light emitting element array chips 400-2, 400-4, . . . , and 400-20 in the row A and a part of light emitting elements 602-B of the surface light emitting element array chips 400-1, 400-3, . . . , and 400-19 in the row B, where the surface light emitting element array chips in the row A and the surface light emitting element array chips in the row B are arranged in a staggered manner. In addition, FIG. 7B illustrates the light emission timing of the light emitting elements 602 of the surface light emitting element array chips 400-2, 400-4, . . . , and 400-20 in the row A and the light emission timing of the light emitting elements 602 of the surface light emitting element array chips 400-1, 400-3, . . . , and 400-19 in the row B. FIG. 7C illustrates a latent image formed on the photosensitive drum 102 at the light emission timing illustrated in FIG. 7B.

Figure 8A:
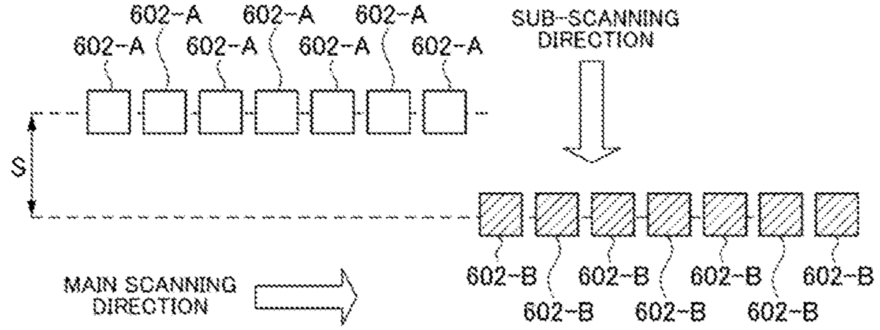
FIGS. 8A to 8C are timing charts of the exposure head according to the first embodiment of the present invention.
Figure 8B:
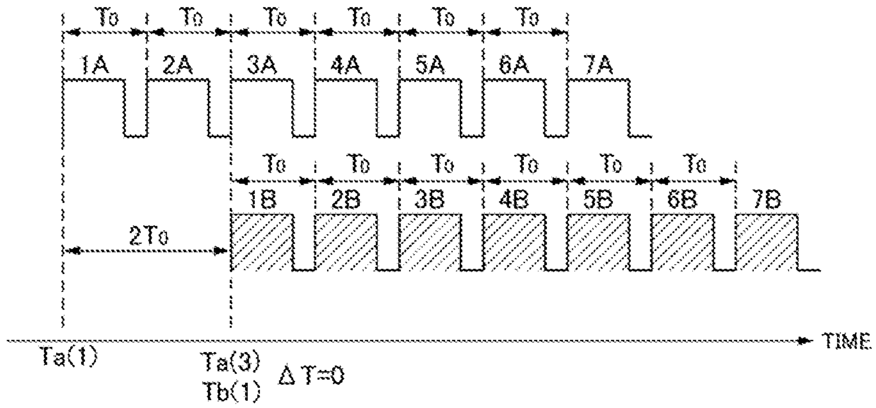
Figure 8C:
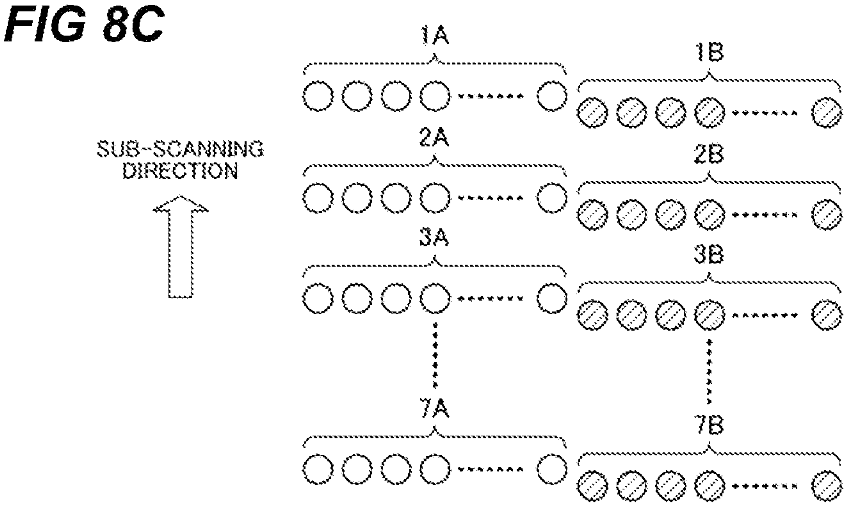

In FIGS. 8A to 8C, FIG. 8A is a diagram illustrating a part of the light emitting elements 602-A of the surface light emitting element array chips 400-2, 400-4, . . . , and 400-20 in the row A and a part of the light emitting elements 602-B of the surface light emitting element array chips 400-1, 400-3, . . . , and 400-19 in the row B, where the surface light emitting element array chips in the row A and the surface light emitting element array chips in the row B are arranged in a staggered manner. In addition, FIG. 8B illustrates the light emission timing of the light emitting elements 602 of the surface light emitting element array chips 400-2, 400-4, . . . , and 400-20 in the row A and the light emission timing of the light emitting elements 602 of the surface light emitting element array chips 400-1, 400-3, . . . , and 400-19 in the row B. FIG. 8C illustrates a latent image formed on the photosensitive drum 102 at the light emission timing illustrated in FIG. 8B.

In FIGS. 7A and 8A, the light emitting elements 602-A are the light emitting elements 602 of the surface light emitting element array chips 400-2, . . . , and 400-20 in the row A, and the light emitting elements 602-B are the light emitting elements 602 of the surface light emitting element array chips 400-1, . . . , and 400-19 in the row B.

FIGS. 7A to 8C illustrate, as an example, a case where the light emitting element rows 604 are arranged in seven rows (lines) in the Y direction (a case where m=7 in FIG. 6C).

In a case where the time required to move a latent image formed on the photosensitive drum 102 by the minimum distance Ly in the Y direction is denoted by T0 and a process speed (a conveyance speed) is denoted by Ps, the relationship between Ly, T0, and Ps is expressed by Equation (2).

$$T0=Ly/Ps \qquad (2)$$

As illustrated in FIG. 7A, the light emitting element 602-A and the light emitting element 602-B are separated from each other by the space S in the Y direction. At this time, in order to cause the light emitting element 602-A and the light emitting element 602-B to perform exposure at the same position in the Y direction on the photosensitive drum 102, it is necessary to delay the light emission start timing of the light emitting element 602-B by S/Ps from the light emission start timing of the light emitting element 602-A. In a case where the delay time at this time is denoted by Td, Td is expressed by Equation (3) from Equations (1) and (2).

$$\begin{aligned} Td &= S/Ps \qquad (3)\\ &= (\alpha+\beta)\times T0 \end{aligned}$$

In FIG. 7B, light emission signals 1A, 2A, . . . , and 7A are light emission signals of a first line, a second line, . . . , and a seventh line of the light emitting elements 602-A. Furthermore, in FIG. 7B, light emission signals 1B, 2B, . . . , and 7B are light emission signals of a first line, a second line, . . . , and a seventh line of the light emitting elements 602-B. FIG. 7B illustrates a case where $\alpha=2$ and $\beta=0.5$.

In this case, as described above, a light emission start time Tb(1) of the light emission signal 1B of the light emitting element 602-B is delayed by a time of $(\alpha+\beta)\times T\mathbf{0}$ from a light emission start time Ta(1) of the light emission signal 1A of the light emitting element 602-A. In addition, in a case where the time between a light emission start time Ta(3) of the light emission signal 3A and the light emission start time Tb(1) of the light emission signal 1B is denoted by $\Delta T$, $\Delta T=(\alpha+\beta)\ T\mathbf{0}-\alpha T\mathbf{0}=\beta T\mathbf{0}$.

Consequently, the light emission start times of the light emission signals 1A, 2A, . . . and the light emission start times of the light emission signals 1B, 2B, . . . overlap with each other in a case where $\Delta T$ is 0 or an integer, but do not overlap with each other because $\Delta T$ is not 0 or an integer since $\beta$ is a decimal. Therefore, noise generated at the start of light emission of the light emitting element 602-A and noise generated at the start of light emission of the light emitting element 602-B do not temporally overlap with each other. As a result, an increase in the intensity of noise can be reduced.

In FIG. 7C, latent images 1*a*, 2*a*, . . . , and 7*a* are formed by the light emitting elements 602-A, and latent images 1*b*, 2*b*, . . . , and 7*b* are formed by the light emitting elements 602-B.

As illustrated in FIG. 7C, the latent image formed by the light emitting elements 602-A and the latent image formed by the light emitting elements 602-B are at the same position in the Y direction on the photosensitive drum 102, and thus the position shift does not occur. As described above, by determining the space S using Equation (1), it is possible to prevent the space S between light emission points from being an integral multiple of the image resolution pitch in the Y direction.

In addition, the light emission timing of the light emitting element 602-A and the light emission timing of the light emitting element 602-B are set such that the latent image formed by the light emitting elements 602-A and the latent image formed by the light emitting elements 602-B are formed at the same position in the Y direction on the photosensitive drum 102. As a result, a shift of $\Delta T$ is always generated between the light emission timing of the light emitting element 602-A and the light emission timing of the light emitting element 602-B, and the increase in the intensity of noise can be reduced.

Next, as a comparison with the present embodiment, a case where the space S between the light emitting element 602-A and the light emitting element 602-B is an integral multiple of the minimum distance in the Y direction of the latent image formed on the photosensitive drum 102 ($\beta=0$) will be described with reference to FIGS. 8A to 8C.

In FIGS. 8A to 8C, the space S between the light emitting element 602-A and the light emitting element 602-B is set to 2Ly. In this case, in order to form the latent image formed by the light emitting elements 602-A and the latent image formed by the light emitting elements 602-B at the same position in the Y direction on the photosensitive drum 102, it is necessary to delay the light emission timing of the light emitting element 602-B by 2T0 from the light emission timing of the light emitting element 602-A. As a result, for example, as illustrated in FIG. 8B, the light emission start time Ta(3) of the light emission signal 3A of the third line of the light emitting elements 602-A and the light emission start time Tb(1) of the light emission signal 1B of the first line of the light emitting elements 602-B overlap with each other, and the intensity of noise increases.

On the other hand, in order to avoid the increase in the intensity of noise, it is conceivable to delay the light emission start time Tb(1) by, for example, 2.5T0 from the light emission start time Ta(3) so that the light emission start time Ta(3) and the light emission start time Tb(1) do not overlap with each other. However, in this case, as illustrated in FIG. 8C, the latent image formed by the light emitting elements 602-A is shifted in the Y direction from the latent image formed by the light emitting elements 602-B on the photosensitive drum 102.

As described above, the space S between the surface light emitting element array chips 400-2, . . . , and 400-20 in the row A and the surface light emitting element array chips 400-1, . . . , and 400-19 in the row B is set by Equation (1). As a result, in a case where the exposure head 106 is formed by arranging a plurality of surface light emitting element array chips 400-1 to 400-20 in a staggered manner, it is possible to reduce an increase in the intensity of noise without degrading image quality.

In the present embodiment, the surface light emitting element array chips 400-2, 400-4, 400-6, . . . , and 400-20 in the row A and the surface light emitting element array chips 400-1, 400-3, 400-5, . . . , and 400-19 in the row B are arranged in a staggered manner along the main scanning direction. In addition, the space S between the surface light emitting element array chips 400-2, 400-4, 400-6, . . . , and 400-20 in the row A and the surface light emitting element array chips 400-1, 400-3, 400-5, . . . , and 400-19 in the row B is set so as not to be an integral multiple of the image resolution pitch in the sub-scanning direction. As a result, noise can be reduced without degrading image quality.

Second Embodiment

Since the configuration of an image forming apparatus according to a second embodiment of the present invention is the same as that of the image forming apparatus 1 illustrated in FIG. 1, the description thereof will be omitted. In addition, since the configuration of an exposure head according to the present embodiment is the same as that of the exposure head 106 illustrated in FIGS. 3A to 6C, the description thereof will be omitted.

<Operation of Exposure Head>

An operation of the exposure head according to the second embodiment of the present invention will be described in detail with reference to FIG. 9.

In the present embodiment, self-scanning light emitting chips in which a self-scanning light emitting device (SLED) is formed on a compound semiconductor substrate are provided as the surface light emitting element array chips 400-1 to 400-20.

Figure 9:
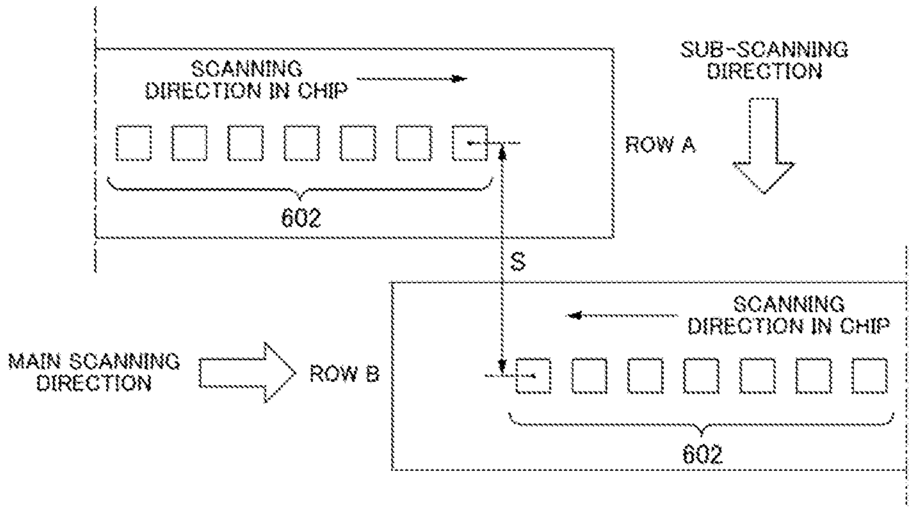
FIG. 9 is a schematic diagram illustrating a configuration of an exposure head according to a second embodiment of the present invention.

As illustrated in FIG. 9, the surface light emitting element array chips 400-1 to 400-20 are chips in which self-scanning light emitting devices are formed in a staggered manner on a compound semiconductor substrate. All of the surface light emitting element array chips 400-1 to 400-20 cannot be turned on at the same time, and a predetermined number of light emitting elements 602 are turned on along the X direction for scanning, thereby exposing the photosensitive drum 102 to light. The surface light emitting element array chips 400-1 to 400-20 include a self-transfer circuit formed by a transfer thyristor, a coupling diode, or the like, in addition to the light emitting element 602.

As illustrated in FIG. 9, in the surface light emitting element array chips 400-1 to 400-20, the light emitting elements 602 are turned on for scanning in directions facing each other. Note that the surface light emitting element array chips 400-1 to 400-20 are not limited to the case where the light emitting elements 602 are turned on for scanning in the directions facing each other, and the light emitting elements 602 may be turned on for scanning in the same direction.

The space S between the surface light emitting element array chips 400-2, 400-4, 400-6, . . . , and 400-20 in the row A and the surface light emitting element array chips 400-1, 400-3, 400-5, . . . , and 400-19 in the row B is set so as to satisfy Equation (1). The light emission timing of the light emitting element 602 is then controlled according to the space S in the Y direction between the surface light emitting element array chips 400-2, 400-4, 400-6, . . . , and 400-20 in the row A and the surface light emitting element array chips 400-1, 400-3, 400-5, . . . , and 400-19 in the row B. Specifically, the light emission timing is controlled such that the exposure positions of the surface light emitting element array chips 400-2, . . . , and 400-20 in the row A and the exposure positions of the surface light emitting element array chips 400-1, . . . , and 400-19 in the row B are the same in the Y direction on the photosensitive drum 102.

In the present embodiment, the image resolution in the Y direction is set to 2400 dpi, and in Equation (1), Ly=10.6 μm, $\alpha$=14, and $\beta$=0.5, and the solution is rounded off to the nearest whole number, so that S=153 μm. In this manner, the surface light emitting element array chips 400-1 to 400-20 are arranged so as to satisfy Equation (1). As a result, even in a case where the surface light emitting element array chips 400-2, . . . , and 400-20 in the row A and the surface light emitting element array chips 400-1, . . . , and 400-19 in the row B perform exposure at the same position in the Y direction of the photosensitive drum 102, the light emission timing can be shifted. Therefore, an increase in the intensity of noise can be reduced.

It goes without saying that the present invention is not limited to the embodiments described above, and can be variously modified without departing from the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-210268, filed Dec. 18, 2020, which is hereby incorporated by reference herein in its entirety.

What is claimed is:

1. An exposure head that exposes a photosensitive drum to light, the exposure head comprising:

a substrate;

a plurality of light emitting chips arranged in a staggered manner in a first direction orthogonal to a second direction corresponding to a rotational direction of the photosensitive drum on the substrate, the plurality of light emitting chips including at least a first light emitting chip and a second light emitting chip, wherein each of the first light emitting chip and the second light emitting chip includes a plurality of light emitting element rows, each of the light emitting element rows including a plurality of light emitting elements which are arranged in the first direction and are configured to emit light for exposing the photosensitive drum with the light; and a digital driving circuit configured to drive the plurality of light emitting elements of the first light emitting chip and the plurality of light emitting elements of the second light emitting chip based on a signal input to the first light emitting chip and to the second light emitting chip for emitting the light, wherein in the second direction, a distance between a position of a center of a one of the plurality of light emitting element rows in the first light emitting chip and a position of a center of a one of the plurality of light emitting element rows in the second light emitting chip is set so as not to be an integral multiple of a pitch corresponding to a resolution of an image to be formed on a surface of the photosensitive drum in the rotational direction, a position where the first light emitting chip is disposed being different from a position where the second light emitting chip is disposed in the second direction, wherein in the second direction, the plurality of light emitting element rows in any of the first light emitting chip and the second light emitting chip are arranged at a pitch spacing that is an integral integer multiple of the resolution pitch of the image to be formed on the surface of the photosensitive drum in the second direction.

2. The exposure head according to claim 1, wherein the first light emitting chip and the second light emitting chip are arranged so as to satisfy:

$$S=(\alpha+\beta)\times Ly$$

where the distance is denoted by S, the pitch is denoted by Ly, α indicates a positive integer, and β indicates a real number satisfying $0<\beta<1$.

3. An image forming apparatus comprising:

the exposure head according to claim 2; and a controller configured to output the signal for emitting the light to each of the plurality of the light emitting chips at a period corresponding to the pitch, the driving circuit driving the plurality of light emitting elements based on the signal, wherein a timing when the plurality of light emitting elements in the first light emitting chip emits the light based on the signal and a timing when the plurality of light emitting elements in the second light emitting chip emits the light based on the signal are shifted between the first light emitting chip and the second light emitting chip.

4. The exposure head according to claim 2, wherein the first light emitting chip and the second light emitting chip emit light at intervals T0 so as to satisfy:

$$T0=Ly/Ps$$

where a rotational speed of the photosensitive drum is denoted by Ps.

5. The exposure head according to claim 1, wherein the plurality of light emitting chips includes a first row in which a first plurality of light emitting chips are arranged in the first direction and a second row in which a second plurality of light emitting chips are arranged in the first direction, wherein the plurality of light emitting elements in each of the first plurality of light emitting chips and the plurality of light emitting elements in each of the second plurality of light emitting chips emit light at a timing when a position in the rotational direction of the image to be formed on the surface of the photosensitive drum by the plurality of light emitting elements in the second plurality of light emitting chips and a position in the rotational direction of the image to be formed on the surface of the photosensitive drum by the plurality of light emitting elements in the second plurality of light emitting chips are the same.

6. The exposure head according to claim 1, wherein the plurality of light emitting elements include a first light emitting element row in which a first plurality of the light emitting elements are arranged in the first direction and a second light emitting element row in which a second plurality of the light emitting elements are arranged in the first direction, a position where the first light emitting element row is disposed is different from a position where the second light emitting element row is disposed in the second direction.

7. The exposure head according to claim 1, wherein each of the plurality of light emitting elements includes an organic EL element.

8. The exposure head according to claim 1, wherein each of the plurality of light emitting chips has the plurality of the light emitting element rows.

9. The exposure head according to claim 1, wherein each of the plurality of light emitting chips has a pad for supplying power to the digital driving circuit.

10. The exposure head according to claim 1, wherein in the second direction, each of the plurality of the light emitting element rows of the first light emitting chip is aligned at a pitch equal to the resolution pitch of the image, and in the second direction, each of the plurality of the light emitting element rows of the second light emitting chip is aligned at a pitch equal to the resolution pitch of the image.

* * * * *